United States Patent [19]
Donaldson et al.

[11] 3,723,057
[45] Mar. 27, 1973

[54] PROCESS FOR STABILIZING ORGANOPHOSPHORUS SOLUTIONS AND IMPARTING ROT AND FLAME RESISTANCE TO ORGANIC TEXTILE MATERIALS

[75] Inventors: Darrell J. Donaldson, Metairie; Donald J. Daigle, New Orleans, both of La.

[73] Assignee: The United States of America as represented by the Secretary of Agriculture

[22] Filed: July 19, 1971

[21] Appl. No.: 164,043

Related U.S. Application Data

[62] Division of Ser. No. 845,562, July 28, 1969, Pat. No. 3,625,738.

[52] U.S. Cl. ............8/116 P, 8/115.7, 8/116.2, 8/127.6, 8/128 A, 8/DIG. 4, 106/15 FP, 117/137, 117/141, 117/140 A, 117/141, 117/138.8 B, 117/143 A, 117/145, 117/155, 117/161 R, 252/8.1, 260/606.5 F, 260/DIG. 24

[51] Int. Cl. ...C07d 105/02, D06m 13/28, C07f 9/28
[58] Field of Search............260/606.5 F; 106/15 FP; 8/116.2, 116 P; 117/137; 252/8.1

[56] References Cited

UNITED STATES PATENTS

3,625,738    12/1971    Donaldson et al.....................117/137

OTHER PUBLICATIONS

Donaldson et al., Textile Research Journal 39, 363–367 (1969)

*Primary Examiner*—George F. Lesmes
*Assistant Examiner*—J. Cannon
*Attorney*—R. Hoffman et al.

[57] ABSTRACT

Metal salts were found to stabilize tetrakis(hydroxymethyl)phosphonium hydroxide (THPOH)-ammonium hydroxide solutions by formation of complexes thereby making it possible to apply THPOH to cotton fabric from a single bath without the use of gaseous ammonia.

1 Claim, No Drawings

PROCESS FOR STABILIZING ORGANOPHOSPHORUS SOLUTIONS AND IMPARTING ROT AND FLAME RESISTANCE TO ORGANIC TEXTILE MATERIALS

This application is a division of application Ser. No. 845,562, filed July 28, 1969, now U.S. Pat. No. 3,625,738.

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for rendering organic fibrous materials flame and rot resistent. More particularly, this invention deals with a method for stabilizing systems containing phosphorus and nitrogen compounds by the use of metal salts. The treating of organic materials with this resulting mixture renders them flame and rot resistant.

THPC reacts with NaOH in the pH range of 6 to 10 to attain a weakly basic mixture which contains a number of products some of which are tetrakis (hydroxymethyl) phosphonium hydroxide (THPOH), tris (hydroxymethyl) phosphine (THP) and other related phosphine and tris(hydroxymethyl)phosphine oxide (THPO). This mixture is referred to as "THPOH." In the past, organic materials were rendered flame resistant by treating fabric with the THPOH mixture, partially drying and then chemically curing with anhydrous ammonia. This process required controlling the degree of drying to prevent decomposition of the active phosphorus compound before curing and also necessitated the use of gaseous ammonia. (Gaseous ammonia gives off offensive odors.)

This invention discloses a simplified pad-cure process for the application of THPOH—$NH_3$ flame retardant to cotton which eliminates the undesirable features mentioned above. This is achieved by adding metal salts to the THPOH solution to produce a system stable in the presence of ammonium hydroxide and other basic nitrogen compounds. Without the metal salt the nitrogen compound reacts immediately upon addition to a THPOH solution to form a white insoluble, polymeric material.

The term fibrous organic material includes any hydrophilic fibrous material, that is, a material that adsorbs or a absorbs water on most of their surface area such as cotton, rayon, jute, wool, paper, carboard, and their combination with man-made fibers such as Avril, polyester, and the like materials. Chemical and physical modifications of such materials which can be impregnated with a liquid and dried are also included. These organic fibrous materials are not limited to desized, scoured, or bleached materials.

The organic fibrous materials treated with the "THPOH" metal complex solution can be in the form of free fibers, sliver, yarn, thread, and woven or nonwoven fabrics. We prefer the use of "spun" textiles such as threads or woven fabrics.

It is an advantage of the process of this invention that the fibrous organic materials may be processed by any conventional technique employing conventional equipment.

By the process of this invention, the addition of a metal salt to a THPOH solution stabilizes the solution and forms an insoluble material only by condition of processing. This solution padded on fabric and properly finished renders the fabric rot and flame resistant.

In general terms, the invention can be described as follows:

1. To a solution containing about 15–50 percent of THPOH a metal salt from 1 percent to about 20 percent is added to obtain the metal phosphorus compound.
2. To this mixture 1–35 percent of concentrated ammonium hydroxide is added.
3. The organic fibrous material is immersed in these solutions and the excess liquid removed by conventional textile methods to give wet pickups ranging from about 50 to about 110 percent.
4. The material is then cured by any conventional manner such as an oven at temperatures ranging from 100°–189°C. for 1 to 15 minutes. Surface active agents, water repellents, softeners and other textile treating agents may be incorporated in the treating bath.

In the instant process, metal compounds of the formula $M_nX_m$ where $n = 1,2$, $m = 1,2$, or 3, M any metal such as copper, zinc, mercury, cadmium, zirconium, chromium, iron, nickel, cobalt, lead, and the like, and X any anion as chloride, phosphate, nitrate, sulfate, hydroxide, acetate, bromide, iodide, carbonate, and oxide and the like can be used. Concentrations of metal compound depend on the particular metal salt and the concentration of the phosphorus compound. Molar ratios of from about 1/1 to about 1/8 metal salts to THPOH were needed for stabilization but the preferred ratio is 1/4 of metal salt to THPOH.

Nitrogen compounds compatible in this system can be ammonia, ammonium salts, amides and amines. The invention is not limited to these but examples of the preferred compounds are phosphoramide methylolacrylamide, formamide, ethylenediamine, O-phenylenediamine, and 1,6-hexamethylenediamine.

The organic fibrous materials so treated retained essentially 100 percent of their breaking strength after treatment and were flame and rot resistant. Rot resistance of the treated cotton textile was determined by burial in soil containing highly active cellulose destroying organisms and samples were removed at various intervals for testing using the AATCC Standard Method 30–1957T. Flame resistance was determined by the standard vertical flame test according to Federal Specification Method 5902 or the match test which is the angle the fabric must be held to extinguish the flame. A fabric having a 135° angle will normally pass the standard vertical flame test.

The following examples are illustrative of the details of the invention. The term "percent" refers to percent by weight.

EXAMPLE 1

A solution was prepared as follows: To 32 g of a 35 percent THPOH solution, a certain concentration of copper salts ranging from 1 g to 2.5 g was added as the solution was kept cold with a water-ice bath. After complete addition, the solution still kept cold in a water-ice bath, 12.5 g of concentrated ammonium hydroxide was added. As shown in Table I 3.3 g of Cu(NO₃)₂·3H₂O was needed to stabilize 32g of 30 percent THPOH from reacting with concentrated ammonium hydroxide. Higher concentrations of copper nitrate were also effective.

TABLE I

| Cu(NO₃)₂·3H₂O | THPOH (30% Sol) | Conc. NH₄OH | Results |
| --- | --- | --- | --- |
| 1 g | 32 g | 12.5 g | Unstable |
| 1.7 g | 32 g | 12.5 g | Unstable |
| 2.1 g | 32 g | 12.5 g | Unstable |
| 3.3 g | 32 g | 12.5 g | Stable |

Cotton fabrics padded with a solution that contained 9.1 g of copper nitrate, 64 g of 35% THPOH solution and 26.9 g of concentrated ammonium hydroxide immediately and after 20 days storage contained the same add-ons and flame resistance. In fact, the fabrics treated with solutions which were 20 days old had slightly higher add-ons than those treated with the solution immediately after preparation. Therefore, this study clearly shows that the solution is quite stable for a long period of time.

EXAMPLE 2

Samples of desired, scoured, and bleached cotton twill were padded with a solution containing 9.1 percent copper nitrate, 64% THPOH, and 26.9% concentrated NH₄OH. The samples were cured at temperature ranges from 130° to 160°C for 5 to 10 minutes in an electric force air oven. The fabric cured at 130°C. had 14.1 percent add-on, 3.52 percent phosphorus, and 1.17 percent copper and after five laundering cycles had a char length of 5.5 inches as measured by the standard vertical flame test.

EXAMPLE 3

Cotton fabrics treated in the same manner as in Example 2 except that the samples were placed in a plastic bag for 18 hours at room temperature before curing at 130°–160°C. for 5 to 10 minutes. A fabric cured in this manner at 130°C. had 12.3 percent add-on, 3.97 percent phosphorus and 1.31 percent copper and was still flame resistant after 5 laundering cycles.

EXAMPLE 4

Desized, bleached, and scoured cotton sateen was padded with the following solution: 177.5 g of 50% THPOH, 26.8 g of Cu(NO₃)₂·3H₂O and 47.2 g of concentrated ammonium hydroxide and cured at 160°C. for 10 minutes. The fabric had a 17.7 percent add-on, 3.76 percent phosphorus and 1.26 percent copper. After 25 laundering cycles the fabric passed the standard vertical flame test with a 3.5 inch char length and possessed 3.07 percent phosphorus and 0.74 percent copper.

EXAMPLE 5

Cotton twill was padded with a solution that contained 9.1% copper nitrate, 64 percent of 35% THPOH and 26.9 percent concentrated ammonium hydroxide to obtain a 70 percent wet pickup. The fabrics were then cured for 1½ to 5 minutes on a tenter frame at 155°C. The treated fabric was rinsed on a jig first with hot water and then with cold water. The cotton fabric cured for 1½ minutes at 155°C. possessed 103.5 percent of its original breaking and passed the standard vertical flame test after 15 laundering cycles with a 3.5 inch char length.

EXAMPLE 6

Cotton twill treated in the same manner as in Example 5 except that it was cured at 155°C. for 5 minutes. The sample after treatment possessed 116 percent of its original breaking strength and after 25 laundering cycles passed the standard vertical flame test with a 3.5 inch char length. After a 3 hour soap soda boil this fabric also passed the standard vertical flame test with a 4.5 inch char length.

EXAMPLE 7

Cotton twill was treated with same solution as in Example 5 except 9.1 percent of copper sulfate was used in place of copper nitrate. The fabrics were cured for 2 to 4 minutes at 155°C. on a tenter frame. The fabrics passed the standard vertical flame test after 25 laundering cycles with char length ranging from 4.5 to 5.0 inch.

EXAMPLE 8

A solution containing 5.0 g copper acetate, 18 g of 35 percent THPOH and 20.2 g of concentrated NH₄OH was padded on a cotton sample to give about 70–80 percent wet pickup and cured for 10 minutes at 150°C. The fabric after washing passed the 180° angle match test.

EXAMPLE 9

A desized, bleached paper sample was treated with a solution containing 9.1 g Cu(NO₃)·3H₂O, 63.7 g of a 40 percent THPOH solution and 27.3 g of concentrated NH₄OH to give about a 70 percent wet pickup and cured 10 minutes at 150°C. The sample was washed and allowed to equilibrate with room conditions. The sample when ignited with a match refused to burn in the standard vertical position.

EXAMPLE 10

A wool sample was treated with the same solution as in Example 9 and cured 10 minutes at 150°C. After washing and drying, the sample had about a 30 percent add-on and failed to burn in the vertical position when ignited with a match.

EXAMPLE 11

Cotton osnaburg was treated with the following solution: 9.1 percent Cu(NO₃)₂·3H₂O, 22.4 percent THPOH and 26.9 percent concentrated NH₄OH to give about a 70–80 percent wet pickup and cured 10 minutes at 130°–160°C. After washing and drying, the fabric had about 11–12 percent add-on. After 4 weeks soil burial the treated cotton had retained about 40 percent of its original breaking strength. The control fabric after 4 days had completely disintegrated.

EXAMPLE 12

Desized, bleached, scoured cotton sateen was treated with a solution containing 64 g of 35 percent THPOH solution, 8 g of Cu(NO$_3$)$_2$·3H$_2$O and 26 g of formamide to give about a 70–80 percent wet pickup and cured at 140°C. for 10 minutes. After washing and drying the fabric passed the standard vertical flame test.

We claim:
1. A relatively stabilized solution containing tetrakis (hydroxymethyl) phosphonium hydroxide and ammonium hydroxide prepared by
   a. adding copper, zinc or zirconium chloride, phosphate, nitrate, sulfate, hydroxide acetate, bromide, iodide, carbonate or oxide to an aqueous solution containing tetrakis (hydroxymethyl) phosphonium hydroxide under cooling conditions to form a complex and
   b. adding concentrated ammonium hydroxide under cooling conditions to the complex-containing solution so formed.

* * * * *